Oct. 8, 1957

W. A. PALMER 2,809,234

VIDEO-RECORDING CAMERA

Filed April 21, 1953

INVENTOR.
William A. Palmer
BY
Flehr & Swain
ATTORNEYS

United States Patent Office 2,809,234

Patented Oct. 8, 1957

2,809,234

VIDEO-RECORDING CAMERA

William A. Palmer, Palo Alto, Calif., assignor to W. A. Palmer Films, Inc., San Francisco, Calif., a corporation of California Application April 21, 1953, Serial No. 350,005

1 Claim. (Cl. 178—7.4)

This invention relates generally to a motion picture camera and method particularly adapted to be used in connection with the photographing of video-screen images.

It is often desirable to make a permanent record on motion picture film of a television program from the pick-up tube, but many difficulties have been encountered because of differences in projection rates in the motion picture and television systems.

The standard television picture in the United States is projected at a rate which is comparable to 30 frames per second as it is composed of 525 horizontal lines repeated 30 times per second. The scanning sequence, when viewing the subject from the pick-up tube is from left to right along these horizontal lines, and from top to bottom. Interlaced scanning is employed in which the spot starts from the upper left hand corner and in $\frac{1}{60}$ of a second scans every other line in travelling to the bottom of the picture and returning. These 262.5 lines which have been scanned in the initial traverse are called the first field. On the next traverse of the spot from the top to the bottom, the other 262.5 lines are scanned. This constitutes the second field and when the two fields are taken together they represent a frame of 525 lines repeated 30 times per second, which is sufficiently rapid repetition to portray motion satisfactorily.

The standard projection rate for the sound motion picture industry is normally 24 frames per second and this is the rate presently used in video recording cameras so that the films can be used on standard sound projectors.

This difference in the two systems creates the problem of obtaining 24 motion picture frames per second from a television picture being repeated 30 times a second.

Conventional video recording cameras expose each motion picture frame to one television frame (2 fields each representing $\frac{1}{60}$ of a second) which leaves $\frac{1}{120}$ of a second $$\left(\frac{1}{24}-\frac{1}{30}=\frac{1}{120}\right)$$

for shutter closing, film pull down, and shutter opening. This means that the motion picture film would be exposed to two complete fields ($\frac{1}{30}$ of a second) and then the shutter would be closed, the film pulled down and the shutter opened to begin the next exposure during this $\frac{1}{120}$ of a second. However, also during this $\frac{1}{120}$ of a second the lines are still being scanned which would mean that one-half of a field would have been scanned before the shutter could be opened again to begin the next exposure. This next exposure would then be comprised of one-half of one field, all of the next field, and one-half of the field after that (representing $\frac{1}{30}$ of a second). During the last half of the last field mentioned (representing $\frac{1}{120}$ of a second) the shutter closing, film pull down and shutter opening would occur and then the following exposure would begin with the beginning of a field and the cycle mentioned above would be repeated. In this manner 24 motion picture frames can be obtained from every 30 television frames. This solves the problem of getting 24 frames out of 30 frames, but it raises a second problem of eliminating "shutter bar" which is caused by the making of an imperfect picture splice which arises in combining imperfectly the upper one-half of one television field with the lower one-half of another television field. As pointed out previously this splice is necessitated because of the time needed for shutter operation and film pull down. Since this splice appears only in every other frame, it is very objectionable if imperfectly made as it is like a 12 cycle per second flicker which is easily perceived by the eye.

The imperfect picture splice is a result of a complicated combination of phosphor decay time, shutter opening and closing, and the gradual increase and decrease of light by the passage of the shutter shadow. All of these factors may vary the exposure of a given television line.

If the motion picture camera is properly synchronized (operated from the same 60 cycle power supply) with the kinescope, the "picture splice" will remain in a fixed position, but if it is not properly synchronized (not operated from the same 60 cycle power supply) the "picture splice" will move upwardly or downwardly depending upon the relative phase relationships of the power supplies of the motion picture camera and the kinescope giving rise to even more drastic "picture splice" problems.

The conventional video recording camera has a shutter which is located between the lens and the film giving rise to a more or less "area modulated" type of closing; that is, the frame is progressively marked off by the moving shutter blade as it covers or uncovers the aperture. In the usual shutter design the image of the shutter blade creates a fairly sharp line as it moves across the aperture. Depending upon the exact location of the conventional shutter and the lens aperture employed, there is a penumbra or fuzzy edge of the shutter, but as far as the image of a television picture is concerned, the process of shutter opening and closing takes place over a time interval of a very few television lines. Therefore, if the picture splice is imperfect, the result on the film is a sharp horizontal line called "shutter bar" which is very annoying. "Shutter bar" is caused by variations in exposure at the splice in comparison with the rest of the frame. Part of this variation in exposure comes from the gradual increase and decrease of light caused by the fuzzy shutter shadow or penumbra as it passes the lines involved in the splice. When the shutter is closing the shutter shadow first cuts off only a little light and the line involved has time to decay through most of its useful range and thus makes almost a full exposure on the film. The next line is further in the shadow and causes a lesser exposure. This gradual decrease occurs until the succeeding lines are blacked out entirely. When the shutter opens exactly the opposite result occurs so that theoretically it should be possible to get a perfect picture splice as one exposure complements the other. Practically, this is difficult to do and hence variations in exposure occur.

To minimize the amount of variation, the present practice has been to use a special P–11 blue kinescope which has a phosphor with a very rapid decay rate whereby the information remains on the tube for the shortest possible time. The normal P–4 kinescope which is used for viewing purposes has a long persistance phosphor which retains the information for a substantial period of time.

Shutter bar is also caused by variations in film emulsion curves, the "intermittent effect," and the fact that in most cameras the penumbra is not symmetrical.

The effect of two successive exposures on a film is not the same as one exposure of the same amount of light that was admitted in the two exposures. This is called the "intermittent effect." The penumbra is not symmetrical because in most cameras the lens is round and the shutter is not usually on the lens axis at the time of making the splice.

Most of the efforts to date to eliminate the imperfect "picture splice" have been expended on the building of precision equipment in order to get perfect synchronism, shutter timing and film positioning so that the exposures caused by the fuzzy shutter shadow on opening and closing will be exactly complementary. This equipment is very expensive and requires great skill in operation and maintenance to give satisfactory results.

With my invention I effect a solution for these problems with a camera and method that are economical and which give very satisfactory results.

In general, it is an object of the present invention to provide a motion picture camera and method particularly adapted for photographing video images which will eliminate or minimize the imperfect "picture splice."

It is another object of the invention to locate a shutter in the optical train in such a manner that in opening and closing, the image on the film will be made to "fade in" and "fade out"; that is, the shutter, in cutting the light on and off, makes no image of the shutter blade on the film but causes the light to decrease uniformly as in a "fade out" effect in the regular movies.

Another object of the invention is to time the motion of the shutter in relation to the film transport so that the act of opening and closing the shutter takes place over a much longer period of time than in the usual video-recording camera.

Another object of the invention is to make the adjustment of the shutter opening for a perfect "picture splice" much less critical than is the case with the usual video-recording camera.

Another object of the invention is to eliminate the use of the iris diaphragm used in the conventional video-recording camera.

Another object of the invention is to obtain a linear opening and closing of the shutter.

Another object of the invention is to obtain an opening and closing of the shutter which will follow the sensitometric curve of the film emulsion and result in a fade-in and fade-out which are exactly complementary.

Another object of the invention is to make possible the use of low contrast film by using a high contrast on the video screen instead of using high contrast film with a low contrast video image.

Another object of the invention is to eliminate the necessity for an extremely accurate shutter action.

Another object of the invention is to make possible the use of a normal P-4 long persistence phosphor pick-up tube.

Another object of the invention is to make possible the use of a less expensive camera.

Other objects and advantages of this invention will appear from the following specification taken in conjunction with the accompanying drawings in which.

Figures 1, 6, 7:
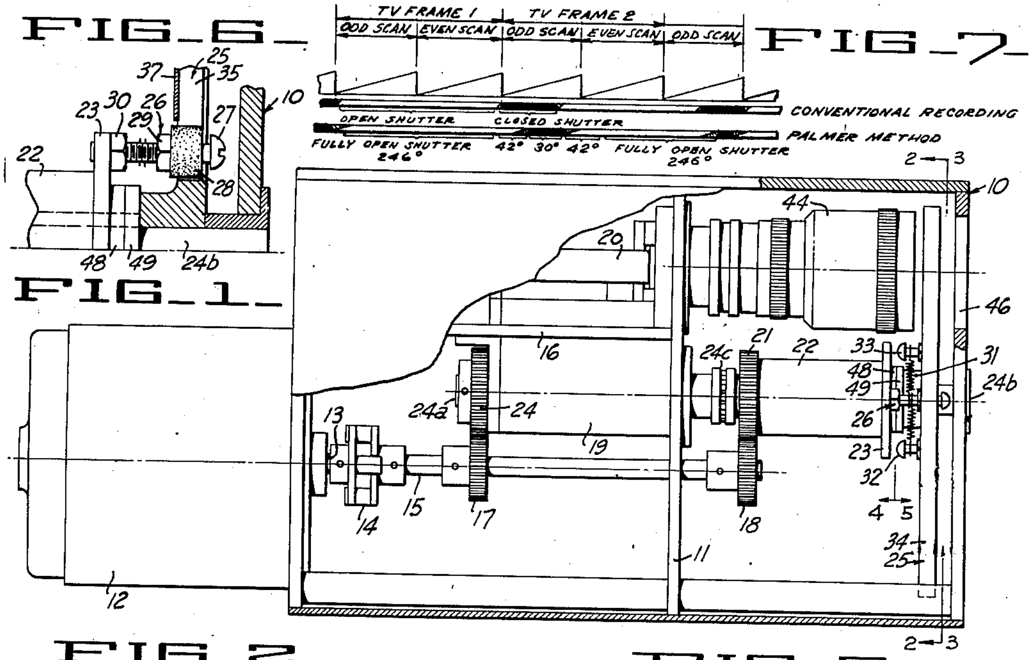
Figure 1 represents a plan view of a video-recording camera incorporating my invention with a portion of the enclosure removed.
Figure 6 is an enlarged cross-sectional view showing the means of connecting the shutter to the operating member.
Figure 7 is a graphic illustration of the timing sequence between the video and motion picture frames in conventional recording and according to the present invention.

In general, the present invention consists of a moving picture camera having an optical system, a film transport mechanism and a special shutter assembly.

The embodiment of my device as shown in the drawing consists of a case 10 which serves as an enclosure for the film transport mechanism 19, the shutter assembly 25 and the lens assembly 44. A driving motor 12 is mounted on the exterior of the case 10 and serves to drive spur gears 17 and 18 which are fixed to shaft 15 journalled in the supporting wall 11 mounted within the case 10. Shaft 15 is connected to motor shaft 13 by means of a shock absorbing coupling 14.

The film transport mechanism 19 is mounted on the supporting wall 16 and is adapted to be driven by a spur gear 24 which is fixed to shaft **24*a* and meshes with spur gear 17**.

The shutter assembly 25 is adapted to be driven by a sleeve 22 which is rotatably mounted on a shaft **24*b*. Spur gear 21 is integrally attached to the sleeve 22 and is adapted to be driven by the gear 18. Shaft 24*b* is suitably journalled in one end wall of the case 10 and has its other end supported by thrust bearing 24*c* which is mounted on the supporting wall 11**.

The shutter assembly 25 is comprised of a hub portion which is rotatably mounted on the shaft **24*b* and is provided with a pair of radially extending spokes 35 and 36 which provide support for the circular rim 34. The smaller sector shaped area formed by the spokes 35 and 36 is covered with a shield 37 which may be attached to the spokes by any suitable means such as by screws 38 through 41**.

An additional shield 42 for a purpose hereinafter described is adjustably mounted on spoke 36 by means of screws 38 and 39. A suitable counterbalance 43 is provided on the rim 34 diametrically opposite the smaller sector shaped area enclosed by the spokes 35 and 36.

Figure 4:
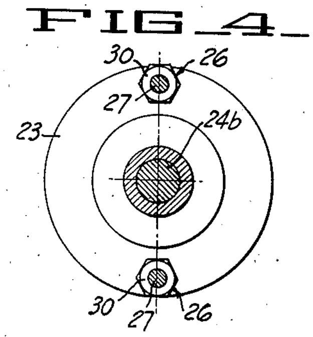
Figure 4 is an enlarged elevational view of the shutter operating mechanism taken along the line 4—4 of Figure 1.
Figure 5:
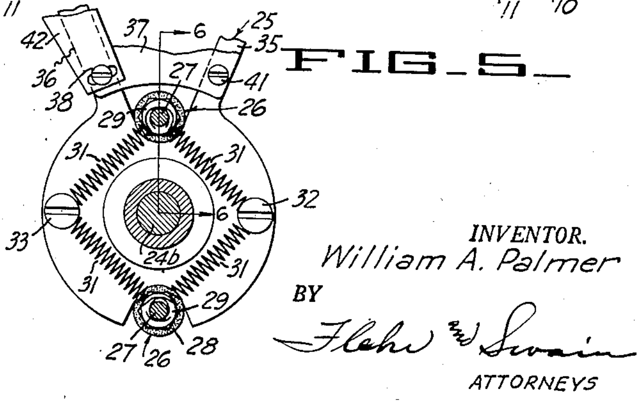
Figure 5 is an enlarged elevational view of the shutter operating mechanism taken along the line 5—5 of Figure 1.

Any suitable means may be used for resiliently connecting the shutter assembly 25 to the rotatable sleeve 22. One means found satisfactory, as shown in Figures 4, 5 and 6, consists of a pair of bolt assemblies 26. Each bolt assembly, which is shown in detail in Figure 6, is comprised of a bolt 27 threaded into flange 23 on the sleeve 22 and which is locked in position by nut 30. A felt washer 28 is fitted on each bolt 27 and rests loosely in an arcuate groove in the hub portion of the shutter assembly 25. The felt washer is retained in this position by means of nut 29.

A plurality of springs 31 are connected between the bolt assemblies 26 and bolts 32 and 33 in a manner as shown in Figure 5. The bolts 32 and 33 are threaded into the hub portion of the shutter assembly 25 and form fixed mounting posts. The springs form an additional resilient connection between the shutter 25 and the sleeve 22, and they also serve to damp the operation of the shutter as it reaches its running speed.

Additional damping is povided between the shutter assembly 25 and the sleeve 22 by means of washers 48 and 49 which are mounted on shafts **24*b*, washer 48 being attached to flange 23 and washer 49 being attached to the shutter assembly 25. Further damping is obtained by placing a viscous lubricant between the two washers 48 and 49**.

A suitable lens assembly 44 comprised of a plurality of lens elements is provided behind the shutter assembly 25. In accordance with my invention, I have found when using a lens assembly of unsymmetrical formula such as the 2 inch "Kodak" anastigmat F 1.6 that it is desirable to place the aperture immediately behind the shutter assembly 25 and in front of the lens assembly. I have provided such an aperture by coating the outer lens of the lens assembly 44 with an opaque substance in such a manner that an aperture 45 of the desired dimensions is obtained. Identical results could be obtained by placing a metal shield with the proper aperture over the lens. Satisfactory results can be obtained with any lens by placing the shutter in the conventional place of the usual lens diaphragm, that is, between the lens elements of the lens assembly 44.

A suitable opening 46 is provided in one end of the case 10 so that the lens assembly 44 may properly view the video image.

Figure 2:
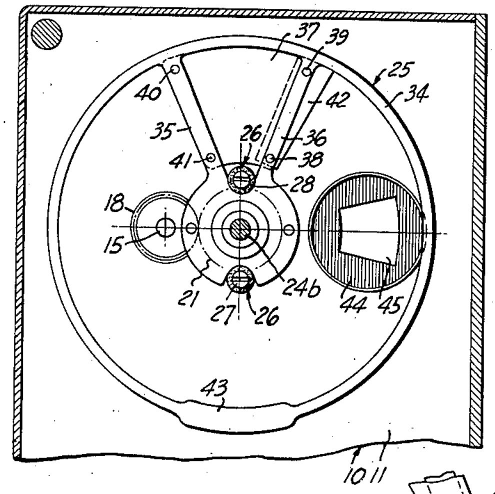
Figure 2 is an enlarged elevational view showing the shutter in an open position taken along the lines 2—2 of Figure 1.
Figure 3:
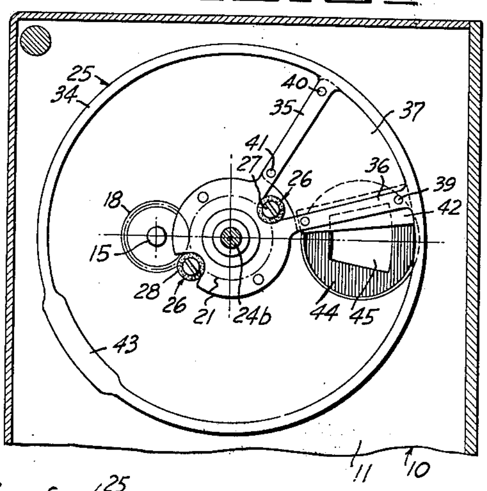
Figure 3 is an enlarged elevational view showing the shutter just as it is beginning to close taken along the line 3—3 of Figure 1.

Operation of the embodiment of my invention described with reference to Figures 1, 2 and 3 is as follows: The kinescope image to be recorded is viewed through opening 46 and if the shutter 25 is in an open position as is shown in Figure 2, this image will be projected through aperture 45 and then to lens assembly 44 onto film strip 20.

The motor 12 drives both the shutter assembly and the film transport mechanism in a synchronized manner so that the shutter assembly is closed during the interval when the film is advanced. Figure 3 shows the shutter assembly 25 just as it is beginning to close.

I have found that the following design has given excellent results. A large diameter (*f* 1.6) lens was used as it is desirable to cause the opening and closing of the shutter to take place over a relatively long period as compared to usual video-recording cameras. To utilize such a long period for opening and closing of the shutter makes it necessary to use a very fast pull down rate for the intermittent movement of the film.

Assuming that the time necessary for the exposure of one frame of motion picture film together with the closing and opening of the shutter and the time necessary for the pull down constitutes 360°, I find that if the pull down was made to take place within 30° of the motion picture cycle, very satisfactory results were obtained. The shutter is operated at the conventional speed of 1440 revolutions per minute or one revolution every $1/24$ of a second. With a 30° pull down time for the film, the shutter must completely cover the lens aperture for at least 30°. This 30° is represented by the blacked out portion of my method illustrated in Figure 7. Since the shutter of my video recording camera has substantially the conventional width of 72°, this leaves about 42° which may be utilized for moving the shutter from a fully open to a fully closed position and the same amount for moving the shutter from a fully closed to a fully open position. Therefore, to cause the opening and closing of the shutter to take place over a long period of time to effect a graduated transition of light intensity passing through the lens, the large diameter lens described above was preferably utilized. The lens should be of such a size that the sector-shaped aperture 45 in the lens has a width of approximately 42° to take advantage of time that can be utilized for moving the shutter between open and closed positions. However, as is readily apparent, apertures of greater width can be utilized if shorter pull down times are feasible.

If an aperture of approximately 42° is utilized, the exposure of the motion picture film in my camera will take place as shown in the cross-hatched portion of the illustration in Figure 7 with 42° being utilized for moving the shutter from a fully open position to a fully closed position and 42° being utilized for moving the shutter from a fully closed to a fully open position. As explained previously, the shutter is completely closed for 30° to allow for film pull down. By causing the opening and closing to take place over this much longer period of time, the "picture splice" takes place over an interval of 60 to 80 television lines. It is for this reason that the adjustment of the camera for a perfect "picture splice" is much less critical than is the case with the conventional video recording camera. It is also for this reason that a lens aperture of less than 42° may be utilized to obtain satisfactory results.

In my invention the shutter is actually an integral part of the optical train and theoretically my shutter should be positioned at the optical center between the lens elements of the lens assembly 44 or the position normally occupied by the stop diaphragm. However, it was found in my design that a satisfactory approximation of this position, still permitting the improved results of my invention, was to locate the shutter immediately in front of the lens assembly.

In my invention, the shutter was made to open or close in 42° of the motion picture cycle, but satisfactory results may still be obtained by varying this time and the film pull down time within reasonable limits.

It is within the scope of this invention to place the shutter at the optical center between the lens elements or at any other position that will give the same results such as placing it in front of the lens which was done in my embodiment.

It is also within the scope of my invention to use different types of shutters to accomplish the same results. My embodiment used the rotary fan-shaped shutter, but similar results may be obtained by the use of the barrel type shutter or any other reasonable mechanical design such as a cam-operated oscillating unit. Similar results can also be obtained by using two shutters running in counterrotation, one in front of and the other behind the lens, or by placing one of them at the focal point between the lens and the other in front or behind the lens train.

In my embodiment the lens assembly was always used in the open position and the usual diaphragm was not used as the exposure was regulated by electronic adjustment of the kinescope image.

The amount of light which the shutter allowed to reach the film while it was open was also controlled by the use of an aperture. In my embodiment the aperture was placed in the lens train near the shutter, however, it is within the scope of my invention to place the aperture in other positions behind the shutter when the shutter is placed in the positions hereinbefore mentioned.

An aperture 45 having the shape of a sector as shown in Figure 2 will give a substantially linear opening and closing of the shutter when used in conjunction with a shutter which is also sector shaped. The curve of the opening and closing rates can be modified to suit the requirements needed for matching the film curve by changing the shape of the aperture and reshaping the edge of the moving shutter. Some variation for various film characteristics may be made in my embodiment by adjustment of shield 42 depicted in Figure 2.

Thus it is possible in my invention not only to be able to make accuracy and adjustment of the video camera shutter much less critical than heretofore, but by properly shaping the curve of the opening and closing rates, to make compensation for film characteristics, developing characteristics, and phosphor decay times.

My invention makes it possible to make excellent "shutter bar" free video recordings from the image on the P–4 conventional studio monitor tubes using long persistence phosphor instead of the usual short decay P–11 blue kinescope which normally must be used for video-recording.

My invention also makes it possible to operate the shutter from a simple mechanical filter off the single motor driving the film transport mechanism. Previously it has been found necessary to use a separate motor just to drive the shutter because of the extreme accuracy required for shutter action in the conventional video-recording camera. In my invention variations in shutter action can be tolerated without adverse effects upon the quality of the recording.

My invention allows the use of a low contrast film which also simplifies the picture splice problem as the low contrast film has a longer straight line film curve than does a high contrast film which normally is used in conventional video-recording cameras. Furthermore, by virtue of the P-4 phosphor kinescope and low contrast film, the quality of the picture being photographed can be judged by eye, a situation not possible with the usual P-11 blue phosphor kinescope.

In general, my video recording camera and method make possible the recording of video images wherein the picture splice is not noticeable thereby substantially improving the quality of video recording and at the same time making possible the use of more economical equipment.

I claim:

A camera for photographing video images, exhibited at the rate of 30 video frames per second on motion picture film at the rate of 24 film frames per second in 360° cycles; the camera comprising means of having a pull-down time of approximately 30/360 of a cycle for moving film through an exposure zone, an optical system for projecting and focusing the light from said video images onto the film in said zone, means defining a lens aperture in said optical system, the lens aperture subtending an angle of approximately 42°, shutter means subtending approximately 72° cooperating with said aperture and effectively positioned substantially at the optical center of the optical system, on the object side thereof, to prevent the projection of a fuzzy shutter shadow onto the film, said shutter means and said lens aperture defining means to effect opening and closing of the aperture, the positioning of the shutter means resulting in the uniform graduation of light from the entire area of said video images to the entire area of said zone, said shutter means moving from a fully open position to a fully closed position within approximately 42/360 of a cycle and from a fully closed position to a fully open position within approximately 42/360 of a cycle, the shutter means being fully closed for no more than approximately 30/360 of a cycle, the film pull-down occurring during the time the shutter means is fully closed, and means for cyclically operating the film moving means and the shutter means through a complete cycle every 1/24 of a second.

References Cited in the file of this patent

UNITED STATES PATENTS

| | | |
|---|---|---|
| 924,147 | Curtiss | June 8, 1909 |
| 926,970 | Watkins et al. | July 6, 1909 |
| 1,425,461 | Evans | Aug. 8, 1922 |
| 2,287,322 | Nelson | June 23, 1942 |
| 2,333,728 | McNabb | Nov. 9, 1943 |
| 2,414,319 | Milholland | Jan. 14, 1947 |
| 2,251,786 | Epstein | Aug. 5, 1951 |
| 2,677,012 | Bach | Apr. 27, 1954 |